Feb. 5, 1946. H. H. SNYDER 2,394,115
SHAPING OF GLASS TUBES
Filed July 18, 1942 7 Sheets-Sheet 1
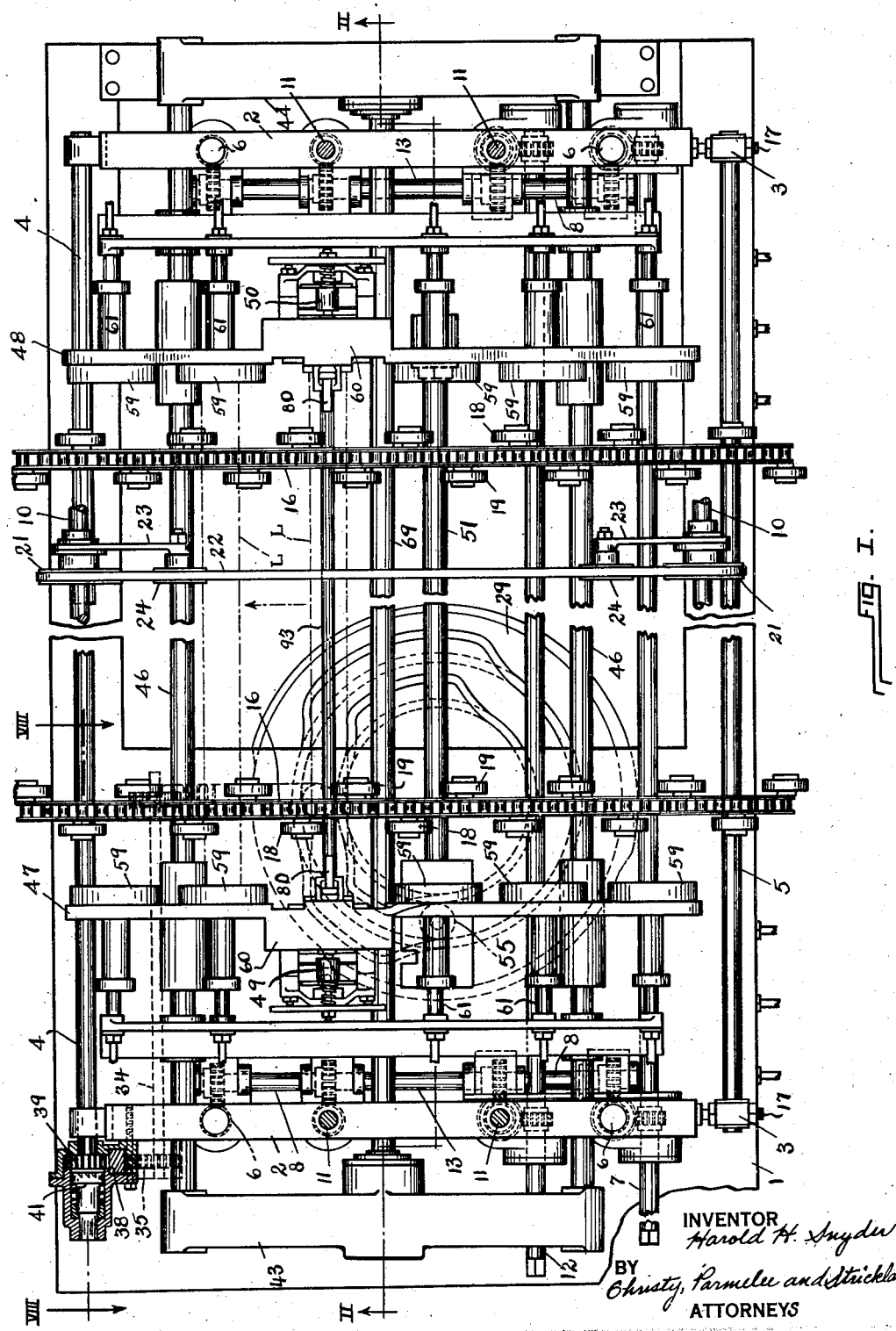
FIG. I.
INVENTOR
Harold H. Snyder
BY
Christy, Parmelee and Strickland
ATTORNEYS

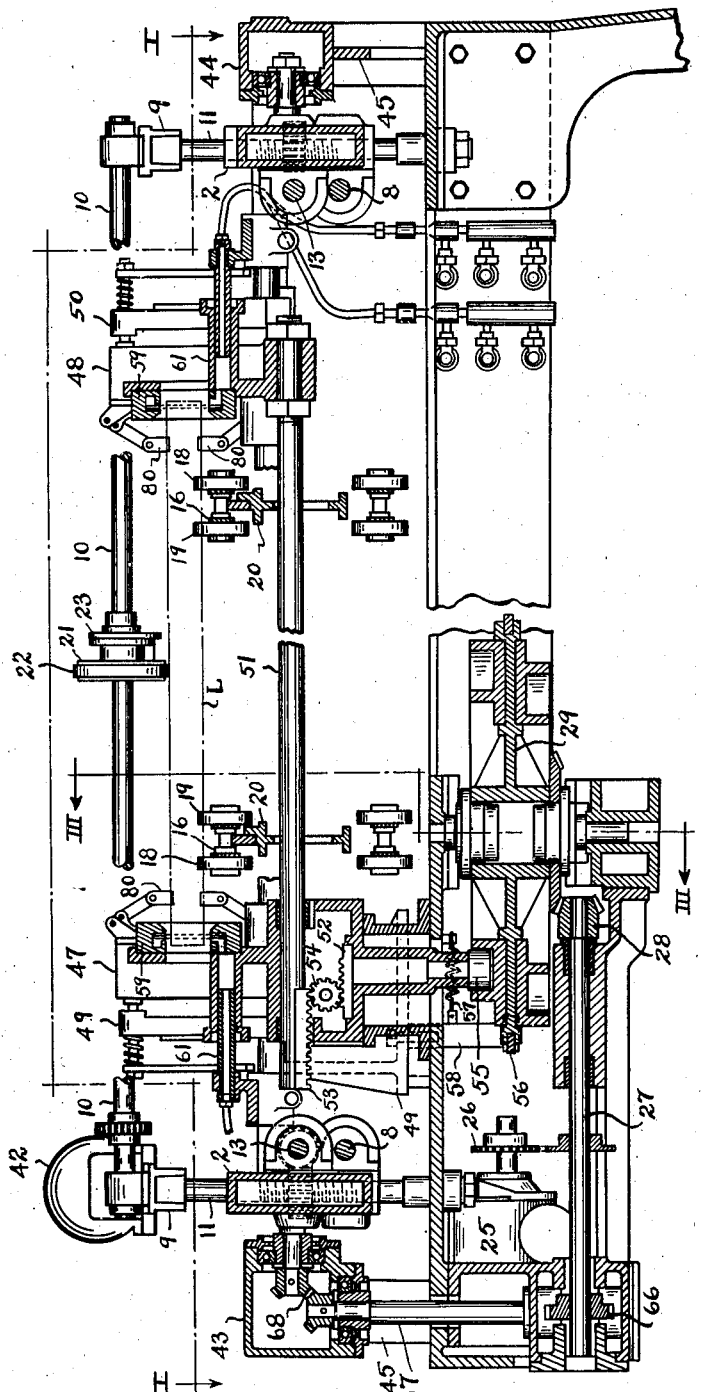

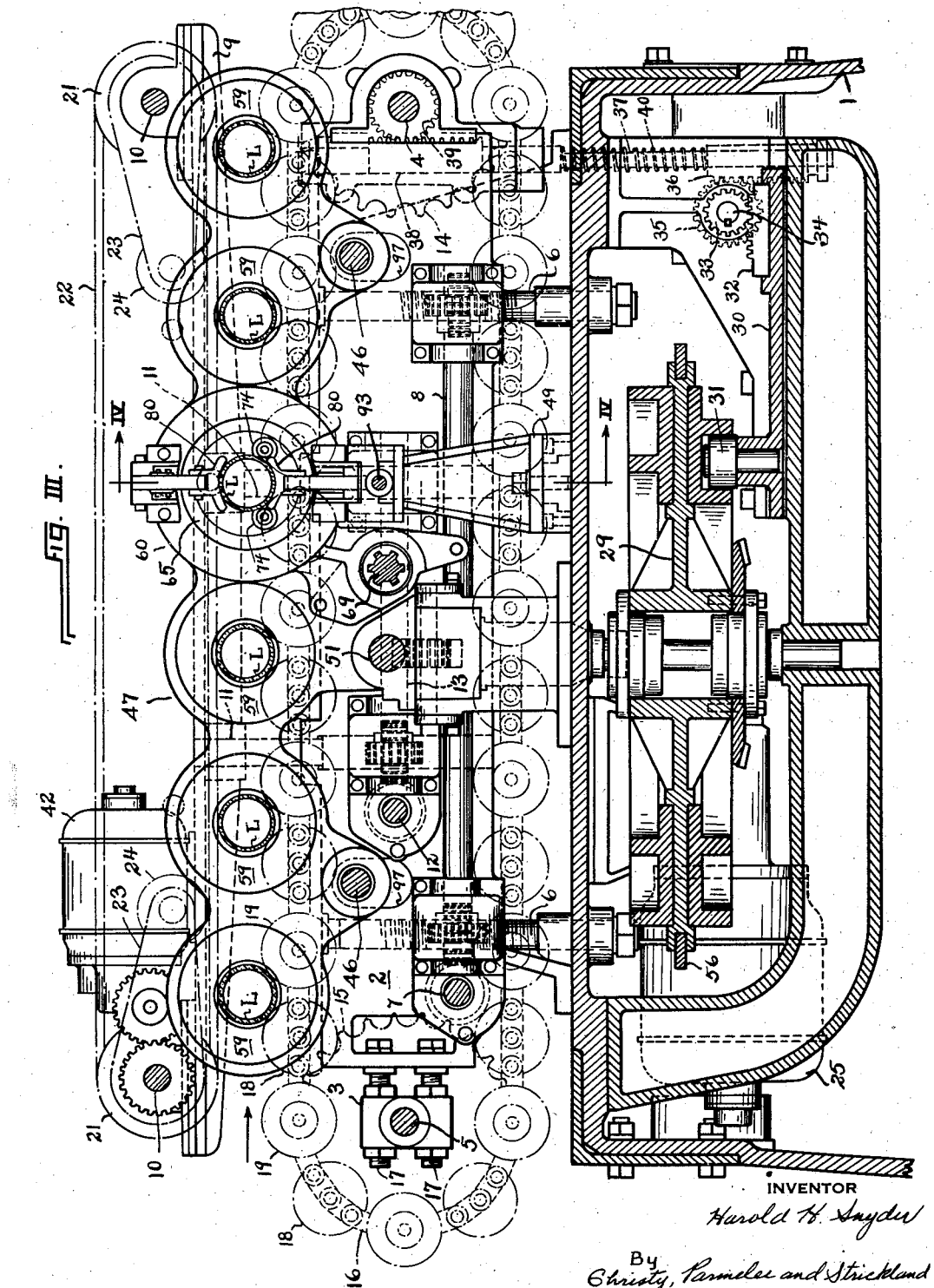

Feb. 5, 1946. H. H. SNYDER 2,394,115
SHAPING OF GLASS TUBES
Filed July 18, 1942 7 Sheets-Sheet 4
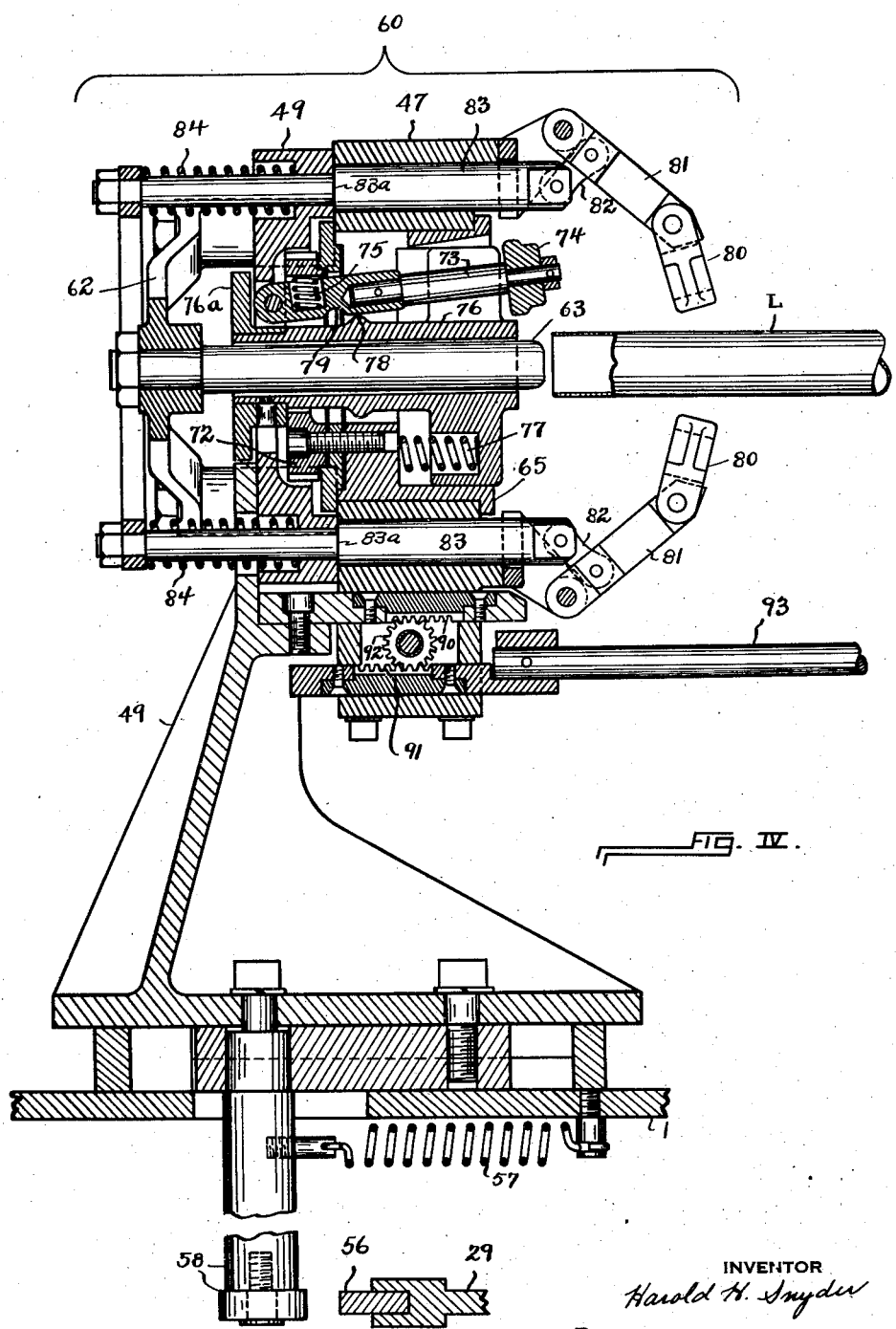
FIG. IV.
INVENTOR
Harold H. Snyder
By
Christy, Parmelee and Strickland
ATTORNEYS

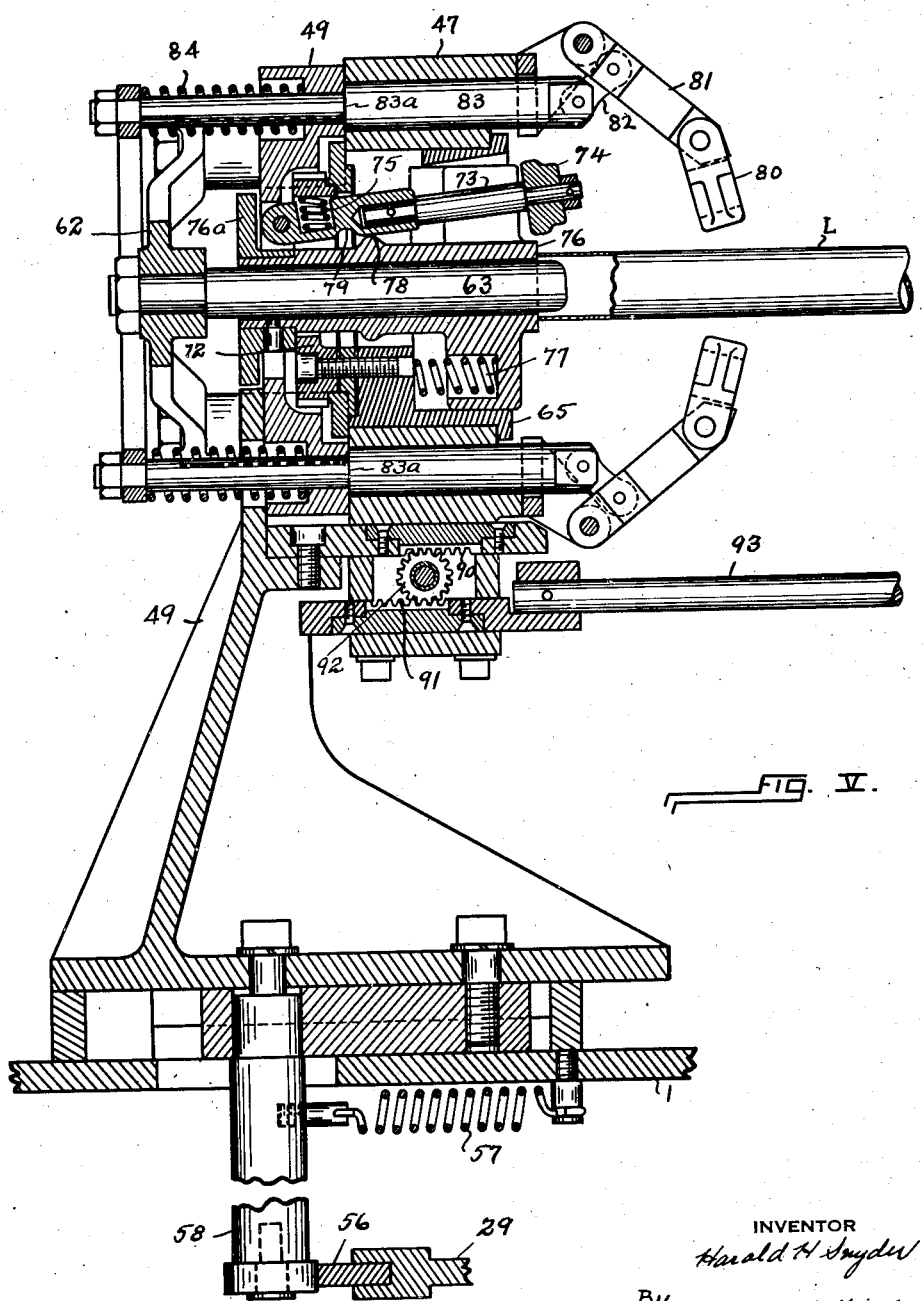

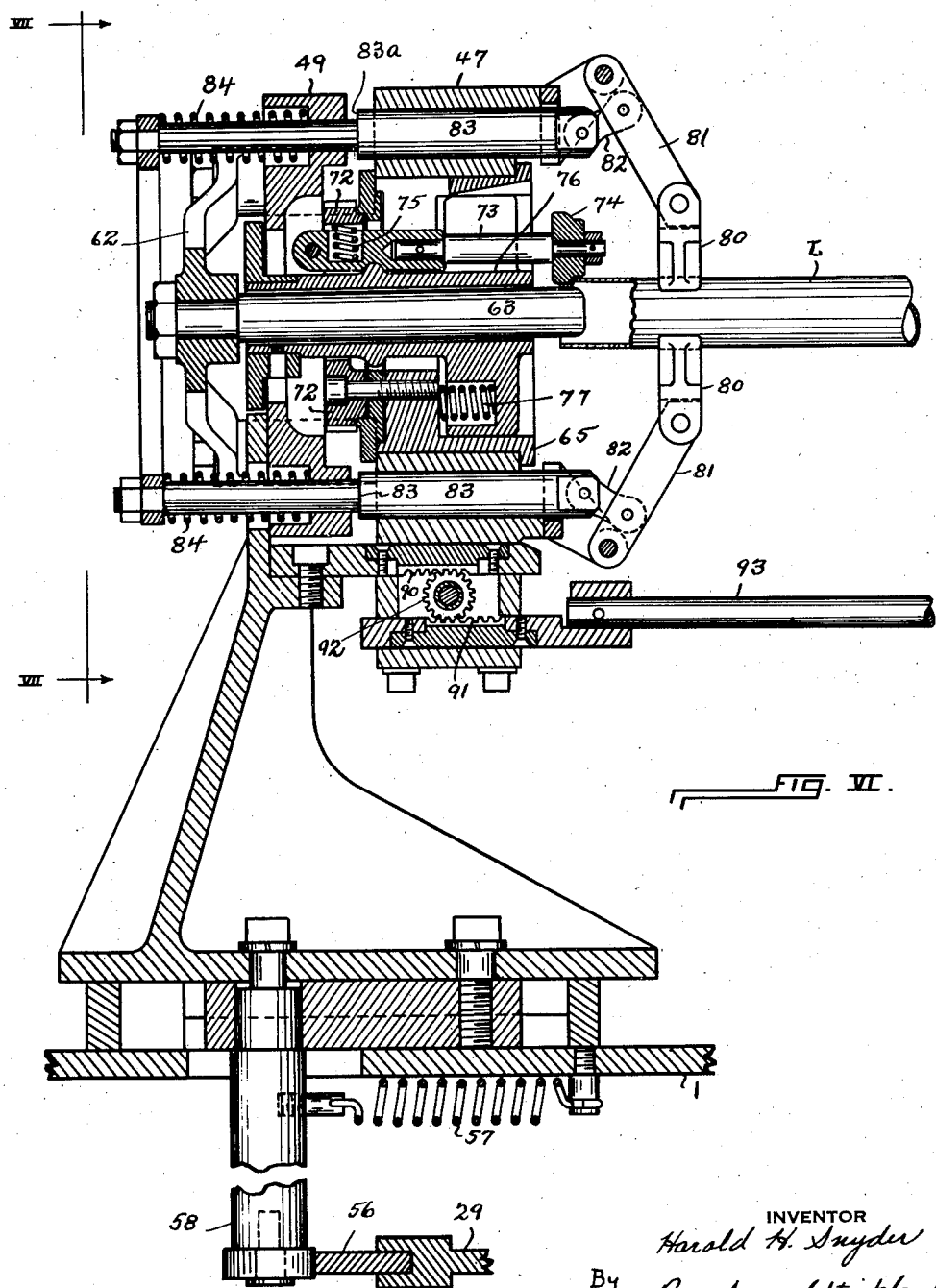

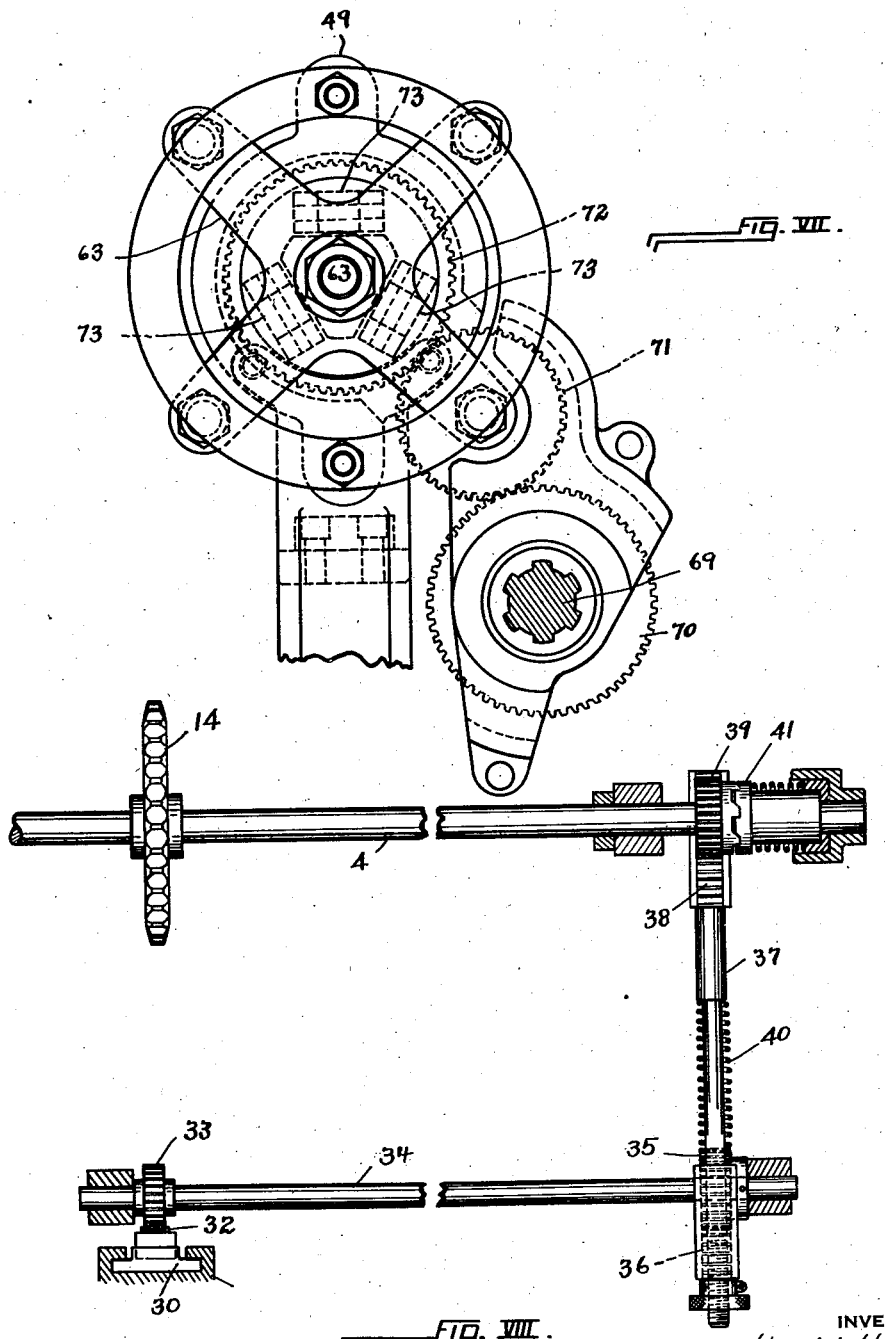

Patented Feb. 5, 1946

2,394,115

UNITED STATES PATENT OFFICE 2,394,115

SHAPING OF GLASS TUBES

Harold H. Snyder, Mount Lebanon, Pa., assignor to Forter-Teichmann Company, Pittsburgh, Pa., a corporation of Pennsylvania Application July 18, 1942, Serial No. 451,411

15 Claims. (Cl. 49—7)

This invention relates to the shaping of cylindrical articles of glass, and finds particular application in the forming at the end or ends of an otherwise simple and uniformly proportioned tube of glass a contraction or neck, adapting the tube for service as a luminous-vapor tube for domestic lighting, or for other use of such sort. The object in view is accuracy and uniformity of shape, attained with facility and with avoidance of strain and weakness in the substance of the glass.

In the accompanying drawings Figure I is a view of apparatus of the invention, seen partly in plan from above, partly in section, on the broken plane of section indicated by the line I—I, Figure II. Figure II is a view of the apparatus in vertical and longitudinal section, on the broken plane of section indicated by the line II—II, Figure I. Figure III is a view to larger scale, showing the apparatus in vertical and transverse section, on the broken plane III—III, Figure II; and in Figure III certain parts are, for clarity of illustration, drawn in broken lines. Figure IV is a view to yet larger scale, showing in vertical and longitudinal section a detail. The plane of section is indicated at IV—IV, Figure III. Figures V and VI are views which, corresponding to Figure IV, illustrate successive stages in operation of the parts. Figure VII is a view in elevation, seen as indicated by the line and arrows VII—VII, Figure VI. In this figure a certain shaft, not shown in Figure VI, appears in cross-section. Figure VIII is a view, partly in side elevation, partly in vertical and longitudinal section, on the plane VIII—VIII, Figure I, illustrating, analysed out from associate parts, the mechanism that effects the step-by-step advance of the work-supporting chains of the apparatus.

In an application for Letters Patent of the United States, filed June 9, 1942, Serial No. 446,333, I have described apparatus for cutting lengths of glass tubing accurately to size. That apparatus includes means for supporting and advancing successive lengths of tubing to be cut, for causing these lengths of tubing to rotate axially as they advance, and for bringing them accurately to position for being operated upon. The apparatus of the present invention includes features in common with that referred to. And the machine of the present invention is adapted to receive and to operate upon the product of the machine of the earlier application alluded to.

On a suitable standard 1 two frames of proper rigidity are mounted, in such manner as to be minutely and accurately adjustable in vertical direction in their mounting. One of these frames, the lower in position, consists of two beams 2, each having at one end an adjustable extension 3, and of two shafts 4 and 5, rotatably journaled in the beams. The two beams of this frame rest, each upon two jack-screws 6 set in the standard, and these jack-screws are turned for the raising and lowering and the minute adjustment of the frame by means of a wrench-turned shaft 7 through suitable cross-shafts 8 and interconnecting spiral gearing. The other of the frames, the upper, consists of two beams 9, and two shafts 10 rotatably journaled in the beams 9. This second frame rests upon pairs of jack-screws 11 set in the beams 2, and these jack-screws are operated by means of a wrench-turned shaft 12 through suitable cross-shafts 13 and interconnecting spiral gearing.

The first and lower frame carries, mounted on its shafts 4 and 5, sprocket wheels 14, 15 (Figure III) that carry pair by pair endless conveyor chains 16, 16. The shaft 4 is journaled immediately in the beams 2; the shaft 5, in the extensions 3. The extensions 3 upon the beams 2 are borne by adjustment screws 17, that the sprocket chains may be brought to and maintained at the proper degree of tautness. The conveyor chains extend in parallelism and present horizontally extending upper reaches. The chains are equipped with pairs of work-sustaining disks 18, 19 adapted, pair by pair, to form in the upper reaches of the chain upwardly flaring recesses in which the work L may rest. The pairs of disks upon the two chains are aligned, so that the pieces of work rest singly, each upon two pairs of disks 18, 19. It is advantageous that the disks be borne upon spindles that extend laterally from the chains, and that ball bearings be provided, to afford no more than minimum resistance to the rotation of the supported work. Referring to Figure I, it may be understood that lengths of glass tube, accurately trimmed to standard length, are placed one by one on pairs of disks at the lower side of the figure and are carried by the advancing chains in direction from the bottom of the sheet to the top, and are at the top delivered again. In this progress they are subjected to the instrumentalities in which this invention centers. Referring to Figure III, the progress of the work is from left to right. The first frame includes beams 20 (Figure II) also borne at their ends by shafts 4 and 5. Upon these beams the conveyor chains 16 rest throughout their upper work-carrying reach, that the work shall be sustained in accurately determined position.

The second, and upper frame carries, mounted on its shafts 10, drums 21, and upon these drums an endless belt 22 is trained. In the organized machine the lower reach of this belt 22 extends in horizontal course, above and at an interval from and parallel to the chain conveyor. Upon the shafts 10 of this second frame arms 23 are pivotally mounted. These arms at their distal ends carry rollers 23, and the rollers, resting by gravity and from above upon the lower reach of the belt 22, hold it yieldingly but firmly to the work.

By means of the jack-screws 6 and 11 it will be perceived that, not only may the space interval at which the conveyor chains 16 and the belt 22 stand apart be minutely and accurately adjusted, but the axial centre of the work (whether of large or small diameter) may be brought precisely to constant and predetermined height above the standard upon which the frames are mounted.

The conveyor mounted in the lower frame is driven by a motor 25 that is mounted in the standard 1, and the drive is intermittent and periodic. Through sprocket drive 26 (Figure II) the motor 25 constantly rotates a shaft 27, and through bevel gearing 28 the rotating shaft constantly rotates a cam disk 29. Referring particularly to Figures III and VIII, a slide 30 will be seen, reciprocable in standard 1; the cam disk 29 will be seen to be provided with a cam track in which, by means of a roller equipped stud 31, the slide is engaged; and, as will be understood, the cam track is so shaped that, with each rotation of the disk, the slide is reciprocated through a predetermined range and during an interval of time that is a predetermined fraction of the time required for a complete rotation of the disk. The slide 30 is reciprocated horizontally in a runway provided for it in standard 1. The slide carries a rack 32, and the rack is engaged by a pinion 33 borne by a shaft 34 that, mounted in the standard, extends horizontally and at right angles to the line of reciprocation of the slide. Shaft 34 carries a second pinion 35, and this pinion engages a rack 36 that is borne by and telescopically movable upon a stem 37 vertically reciprocable in standard 1. The stem carries rigidly a second rack 38, and rack 38 is engaged by a pinion 39; pinion 39 is borne by the shaft 4 of the first frame above mentioned—the shaft that carries the sprocket wheels 14 and drives the conveyor. Reciprocation of rack 36 is imparted to rack 38 through a compression spring 40; and rotation is imparted to shaft 4 through a one-way, spring-backed clutch 41. By these means each rotation of disk 29 effects, through a thrust that is cushioned by the interposed spring, an advance of the conveyor through a predetermined interval of space and time, and cessation of conveyor advance during an ensuing interval of time while the driving parts make their reciprocal and return travel.

The belt 22 mounted on the upper frame is constantly and positively driven by a motor 42 which also is mounted on the second frame. Referring particularly to Figure III, the direction of advance of the work L resting upon the upper reach of chains 16 is from left to right, while the direction of travel of the lower reach of the belt 22 is from right to left. The belt 22 bears yieldingly upon the lengths L of glass tubing that rest upon the rollers 18, 19 of the conveyor chains and rotates them (in counter-clockwise direction, as seen in Figure III), and such rotation of the work continues during the intervals of time when the conveyor is at rest. As has been said, the belt 22 is adjustable in its position above the conveyor, to afford accommodation to tubing of different sizes, as well as to make nice adjustment to any given size.

A third and stationary frame is borne by the standard 1. It consists of hollow beams 43, 44 and of rails 46 connecting the beams. The beams are mounted on integral leg portions 45 secured to the standard. Upon the rails 46 a pair of slides 47, 48 is mounted, and upon the table-like top of standard 1 a second pair of slides 49, 50 is mounted for reciprocal advance and retreat. The slides 47, 48 are organized to move oppositely and in unison by means of a stem 51 borne by one of the pair, racks 52 and 53 borne severally by the stem and by the other member of the pair, and a pinion 54 simultaneously engaging the two racks. The cam disk 29 carries a second cam track, engaged by a roller-equipped stud 55 that extends from slide 47, and proper shaping of the cam track brings it about that with each rotation of the cam disk the slides 47, 48 advance and recede again. The two cam tracks are so arranged and proportioned that it is during the period when the conveyor is at rest that the slides 47, 48 advance and recede; and the duration of time while the slides are advanced is adequate for the various ends to be described. The disk 29 is shaped at its edge 56 to serve as a cam. The slide 49 carries a roller-equipped stud 58 that is urged by a spring 57 to engagement with the edge 56 of cam 29, and save only to the extent that the cam edge 56 varies in outline or pattern (as it in fact does) from the cam groove in which the roller-equipped stud 55 of slide 47 is engaged, the slide 49 moves in unison with the advancing and receding slide 47. Due to the variation in the contour of these two cam portions there is, at certain points in the operation of the slides, relative movement between the slide 49 and the slide 47, this with effects presently to be described. After the manner that the slide 48 is (by the racks 52, 53, pinion 54 and shaft 51) caused to advance and recede in unison with the slide 47, the slide 50 is caused to move relatively to slide 48 according as the slide 49 moves relatively to the slide 47. The means to this end consist in racks 90 and 91 that mesh with a pinion 92 journaled in the slide 47. The rack 90 is bolted to the slide 49, and as slide 49 is by the cam edge 56 and spring 57 caused to shift relatively to the slide 47, the pinion 92 is rotated, with the effect that the rack 91 is shifted in opposite direction. This movement of the rack 91 is by a shaft 93 transmitted to the slide 50.

In Figure II a heating element in the form of an annular burner 59 is shown in vertical and diametrical section; and in Figures IV, V, and VI a unit 60 for the spinning to shape upon a mandrel of the ends of a length of tube is shown to larger scale, also in vertical and diametrical section. Referring to Figure I, it will be seen that each of the two slides 47, 48 carries five burners 59 and one shaping unit 60; and that these parts are arranged in the course of the advance of the work—first, three successively acting burners, then the spinning unit, and after the spinning unit two more successively acting burners. Of the structurally identical burners it remains only to say that gas connections are provided for each with telescopic members 61, to permit of the advance and recession of the slides. The spinning units require more minute description. These spinning units are shown in Figures IV-VI, and their drive mechanism in Figure VII of the drawings.

Each unit includes clamps, here shown to be two in number, which close upon the tubular blank and hold it securely against rotation (though still subject to the yieldingly active belt 22 that tends to rotate it) while shaping is in progress; a mandrel, which enters the open end of the tubular blank and upon which the end of the blank is shaped; and spinning rollers, here shown to be three in number, which, closing arcuately upon the blank and engaging it tangentially, rotate as a cluster upon the axis of the blank as a centre, and severally rotatable, each upon its own axis, effect the gradual reduction of the tube-end to smaller diameter. It is important to note that the rollers, closing angularly upon the work, engage and press the blank first at its terminal edge, and in the continued closing movement of the rollers the softened end of the blank is progressively shaped from its terminal edge inward. This affords an effective working of the softened glass, superior to that which would be obtained by closing the rollers radially (instead of arcuately) upon the end of the blank.

The slide 47 (48) is here shaped to a head with cylindrical bore, to which in Figures IV-VI the numeral 47 is immediately applied. This head supports upon a spider 62 the mandrel 63. The mandrel is rigidly supported by the head, and it extends axially through and beyond the cylindrical bore through the head. It is smaller than the bore of the tubular blank, and is of the diameter to which the bore of the blank is terminally to be reduced.

Within the cylindrical bore through the head 47 an annulus 65 is mounted. This annulus is secure against displacement in axial direction within the head, but is rotatable within the head, and throughout all the operation of the machine it is continually rotated by motor 25. Such rotation is effected through shaft 27 (Figure II), gearing 66, shaft 67, gearing 68, and the shaft 69. Shaft 69 is journaled in the two hollow beams 43, 44, and to it a pinion 70 (Figure VII) is splined, that the pinion (borne by the slide 47) may be shifted longitudinally upon it. Gear 72 is bolted to annulus 65 and through the train of gears 70, 71, 72 the drive is completed.

Within annulus 65, and, specifically, within the body of the gear 72 that is bolted to and so made integral with the annulus, three stems 73 are pivoted; they are grouped at equal spacing with respect to the axis of tubing, and they are pivoted to swing in radial planes relatively to such axis. These stems at their distal ends carry, idly rotatable upon them, glass-spinning rollers 74 such in material and shape as, engaging the heated and softened glass, are suitable to impress and shape it. Springs 75 arranged within the annulus and engaging and exerting tension upon the stems 73 afford the shaping force. It will be observed of the glass shaping rollers 74 that in operation they make revolution around the axis of the work, and, engaging the work, they severally rotate, each upon its individual axis.

Within the annulus 65 and immediately surrounding the mandrel 63 is a sleeve 76. This sleeve at one end (the right hand end, Figures IV-VI) is provided with a head that is radially slotted to allow the swinging of stems 73 and engagement (beyond its right hand end) of the rollers 74 with the work. To the rear end (the left end, Figures IV-VI) a flange 76a is integrally secured to the sleeve. The sleeve and the annulus rotate integrally. The spacing between the head at the forward end and the flange at the rear end of the sleeve is such as to permit limited play in axial direction between annulus 65 and sleeve 76. Springs 77 normally hold the annulus and the sleeve in the relative positions shown in Figure IV, with the sleeve shifted forward (to the right) within the annulus.

Exteriorly upon the sleeve 76 a circumferential ridge 78 is formed; and on the inner faces of the stems 73 corresponding notches 79 are sunk. The arrangement is such that, as shown in Figure IV, the stems 73 are held by the ridge 78 in retracted position; but when, by the rearward (right to left) shifting of the sleeve within the annulus the ridge 78 comes to registry with the notches 79, the springs 75 become effective, swinging the stems 73 and yieldingly holding the rollers 74 to effective, glass-shaping engagement with the work. Such shifting of the sleeve within the annulus, and with the effect specified, is accomplished by the right to left shift of the slide 49 relatively to the slide 47; and such relative shifting, and at proper time in the course of operation, is accomplished in the shape and arrangement of the cam edge 56 of disk 29, with relation to the groove on disk 29 that is engaged by the roller-equipped stud 55 projecting from slide 47. Comparison of Figures IV and VI will make plain the two positions of annulus and sleeve.

The clamps 80 are here shown to be two in number, arranged in diametrically opposite positions with respect to the axis of the work, and means are provided for shifting them between the open and inactive position (Figure IV) and the closed and work-engaging position (Figure VI). Each clamp is borne on a toggle, one arm of which, 81, is pivoted to the slide 47, and the other, 82, is pivoted to a stem 83 that is reciprocable in a bore prepared for it in slide 47 and in a direction that is longitudinal with respect to the work to be clamped. The slide 49 when in advanced position (Fig. IV) holds stem 83 in advanced position (to the right, Figure IV), with the clamps in retracted and inactive position. The same shifting of slide 49 to the left, that effects the release of the shaping rollers 74 as already described, effects also the retraction of stems 83 to the left (a retraction that is cushioned by springs 84), and, through the toggle, the closing of the clamps on the work. This, too, will be understood on comparing Figures IV and VI. When the slide 49 (50) makes return reciprocation, it engages shoulders 83a on stems 83 (Figure VI), the stems are shifted in left-to-right direction, and the clamps open again.

Beginning, then, with the parts in the positions shown in Figure IV, let it be understood that the conveyor has brought a length of tubing L, which constitutes the blank for the instant operation, to position of alignment between opposed mandrels 63 of the shaping instrumentality, and has then stopped. Let it also be understood that, before reaching this point in the progress of the operation of the machine as a whole, the blank at its ends has been heated and the glass in those portions sufficiently softened for the end in view. When the blank so prepared has so been brought to position, and when it so rests, the opposite slides 47, 48 are, by the continued turning of the cam disk 29, caused to advance (left to right, Figure IV), and in this advance (the cam edge 56 of the disk 29 permitting), the slides 49, 50 are by spring 57 carried forward in abutment, from the rear, upon slides 47, 48. Thus the parts come to the position shown in Figure V. In this initial movement, the opposite sleeves 76, by abutment endwise upon the blank, have shifted it to such degree as may have been necessary, and have insured its accurate position, overlapping at the two ends in precisely proper and equal degree the ends of the two mandrels 63. Immediately thereafter, while the rotating cam disk 29 is effective to hold the slides 47, 48 in advanced positions, the edge of the disk is effective to force the slides 49, 50 rearward (to the left, Figure V), whereupon, simultaneously, the clamps close upon the work, centre it with respect to the common axis of the two mandrels, stop its rotation, and hold it stationary, while at each end of the work the rollers 74 advance and, under the pressure exerted by springs 75, and themselves travelling in planetary course (revolving about the work axis and idly rotating, each upon its own axis), shape the soft glass to the mandrel, as indicated in Figure VI.

Since the heating and shaping instrumentalities, though movable horizontally, continue in constant vertical spacing above the standard 1, it is manifest that adjustability in height, both of the conveyor and of the blank-rotating belt 22, adapt the machine to operation upon blanks that vary in diameter. The beams 2 of the lower frame are orificed at 97 and through the orifices extend the rails 46 of the stationary frame, and these orifices are elongated, as seen in Figure III, to permit adjustment in the height of the lower frame. The upper frame, it will be understood, in all positions, extends at higher level than and overhangs the stationary frame.

Returning to Figure I, and remarking again the sequence of three pairs of heaters, then the pair of shaping instrumentalities, and finally two pairs of heaters, the explanation is this: by such refinements the blank may, in a machine of step-by-step operation, be brought with expedition to working temperature; and, having been shaped may (still without embarrassment to speed of production) receive such reheating as shall relieve it of the internal strain that shaping tends to produce, and the article may be delivered properly tempered and ready for fabrication, whether into a lamp or in other manner.

I claim as my invention:

1. In apparatus for spinning the end of a glass tube, the combination with an intermittently acting conveyor and means for heating the end of a tubular blank, of spinning means that include a head with cylindrical bore, an annulus rotatable within the bore, a plurality of stems pivoted to the annulus and adapted to swing in planes radial with respect to the tube axis, each stem being equipped with a spinning roller, means for advancing and retracting the head, and means tending to advance the spinning rollers to engagement with the work, and means rendered ineffective on the advance of the head for maintaining the roller equipped stems in inactive position.

2. In apparatus for spinning the opposite ends of a tubular blank of glass, the combination of two oppositely reciprocable heads, means for heating the ends of a blank, and means for positioning a blank with heated ends between the two said heads, the heads being formed with cylindrical bores and each carry rigidly an axially placed mandrel, an annulus rotatable within each bore, and a sleeve surrounding the mandrel movable in axial direction within limited range within the annulus, a spring tending to advance the sleeve within the annulus, a plurality of roller-equipped stems pivotally mounted within the annulus and movable in radial planes relatively to the axis of the positioned blank, springs tending to advance the stems to active positions, clamping mechanism pivoted upon the heads and movable to and from work-clamping positions, means for advancing the heads with sleeves advanced, stems retracted, and clamps open, and means effective in sequence upon the advance of the head for retracting the sleeve, with release of the roller-equipped stems to the operation of the springs severally associated with them, and for swinging the clamping members to closure upon the blank.

3. In apparatus for spinning the end of a glass tube, the combination with an intermittently moving conveyor adapted to sustain a tubular blank and to advance it step by step from station to station, with intervening intervals of rest, a continuously moving belt adapted to engage a blank resting on the said conveyor and tending by such engagement to rotate the so sustained blank, means for heating the end of a sustained and rotative blank during the interval of rest of the conveyor with the blank at one such station in conveyor travel, and spinning means reciprocable to and from operative position relative to a blank with heated end when at rest at a succeeding station in conveyor travel, and means for reciprocating the spinning means in alternation with the conveyor driving means, the spinning means including a clamp adapted to secure the blank against response to said rotation-inducing belt and including also a mandrel and a rotatable spinning roller, and means for revolving the roller about the axis of the blank.

4. In apparatus for spinning the heated and softened end of a glass tube, the combination with a support for the tube of spinning means that include a head with a cylindrical bore, a rotary member journaled in the bore in axial alignment with the supported tube, a plurality of stems pivoted to said rotary member and adapted to swing in planes radial with respect to the tube axis, each stem being equipped with a spinning roller, and means operative upon the stems during the rotation of the said rotary member tending to swing the stems in their pivotal mounting, whereby the rollers progressively engage the glass in the direction of the longitudinal extent of the tube.

5. In apparatus for spinning the heated and softened end of a glass tube, the combination with a support for the tube, of spinning means that include a head with a mandrel shaped at one end to receive said end of the tube, a plurality of stems pivotally mounted within said head and adapted to swing in planes radial with respect to the aligned axes of the mandrel and tube, each stem being equipped with a spinning roller, means for revolving the roller-equipped stems on the axis of the mandrel and tube, and means for swinging the stems and closing the rollers arcuately upon the end of the tube.

6. In apparatus for spinning the end of a glass tube, the combination with a conveyor adapted to support a plurality of tubular blanks and to advance them in direction transverse to their length from station to station, with intervening intervals of rest, of a heating unit and a spinning unit reciprocable to and from encircling positions upon the ends of two blanks sustained by such conveyor at successive stations, means operative during the intervals of rest between successive advances of the conveyor for reciprocating the heating and spinning units, and means for adjusting the conveyor as a unit relatively to and transversely of the line of reciprocation of said heating and spinning units.

7. In apparatus for spinning the opposite ends of a tubular blank of glass, the combination of two axially aligned, oppositely reciprocable heads, means for heating the ends of a blank, and means for positioning a blank with heated ends between the two said heads, means carried by the reciprocable heads for centering a blank axially between the heads, means on said heads for centering the ends of a blank radially with respect to the heads and means organized with said heads for spinning the ends of the centred blank.

8. In apparatus for spinning the opposite ends of a tubular blank of glass, the combination of two axially aligned, oppositely reciprocable heads, means for heating the ends of a blank, and means for positioning a blank with heated ends between the two said heads, means carried by the reciprocable heads for clamping a blank at its ends and centering the blank on the common axis of said heads, and means organized with said heads for spinning the ends of the centred blank.

9. In apparatus for spinning the opposite ends of a tubular blank of glass, the combination of two axially aligned, oppositely reciprocable heads, means for heating the ends of a blank, and means for positioning a blank with heated ends between the two said heads, means carried by the heads for centering a blank between the heads, means organized with the heads for centering the blank radially of the common axis of the heads, and means operable in the heads for spinning the ends of the centred blank.

10. Apparatus for spinning the ends of glass tubes comprising a heating unit and a spinning unit supported in a line, an endless conveyor having a reach for the support of a succession of glass tubes with their ends aligned parallel to the line of said units, means for advancing said conveyor intermittently in a direction transverse to the length of the tubes to bring the ends of the tubes sequentially to position of rest adjacent to said units, means for reciprocating said units transversely of the line of conveyor advance to move said units, in the intervals of conveyor rest, into encircling positions upon the ends of successive tubes.

11. Apparatus for spinning the ends of glass tubes comprising a heating unit and a spinning unit supported in a line, an endless conveyor having a reach for the support of a succession of glass tubes with their ends aligned parallel to the line of said units, means for advancing said conveyor intermittently in a direction transverse to the length of the tubes to bring the ends of the tubes sequentially to position of rest adjacent to said units, means for reciprocating said units transversely of the line of conveyor advance to move said units, in the intervals of conveyor rest, into encircling positions upon the ends of successive tubes, and means for adjusting the conveyor to shift its tube-conveying reach relatively to the line of said units.

12. Apparatus for spinning the ends of glass tubes comprising two spaced sets of aligned heating units and spinning units, an endless conveyor having a reach for the support of a succession of glass tubes between said sets of aligned units, with the ends of the tubes aligned parallel to the aligned units, means for advancing the conveyor in a direction transverse to the length of the tubes to bring the opposite ends of the tubes sequentially to position of rest adjacent to units in said sets, means for reciprocating said sets of units relatively to one another to move said units, in the intervals of conveyor rest, into encircling positions upon the ends of successive tubes supported on said conveyor.

13. Apparatus for spinning the ends of glass tubes comprising a heating unit and a spinning unit supported in a line, an endless conveyor having a tube-supporting reach extending parallel to the line of said units, said conveyor being provided with a series of spaced-apart pairs of disks forming between the peripheries of the disks of each pair a tube-receiving notch and two pairs of such disks aligned transversely of the conveyor providing a tube support, means for rotating the so supported tubes on the conveyor, means for advancing said conveyor intermittently in a direction transverse to the length of the tubes to bring the ends of the tubes sequentially to position of rest adjacent to said units, means for reciprocating said units transversely of the line of conveyor advance to move said units, in the intervals of conveyor rest, into encircling positions upon the ends of successive tubes.

14. Apparatus for spinning the ends of glass tubes comprising a heating unit and a spinning unit supported in a line, an endless conveyor having a tube-supporting reach extending parallel to the line of said units, said conveyor being provided with a series of spaced-apart pairs of disks forming between the peripheries of the disks of each pair a tube-receiving notch and two pairs of such disks aligned transversely of the conveyor providing a tube support, means for rotating the so supported tubes on the conveyor, means for advancing said conveyor intermittently in a direction transverse to the length of the tubes to bring the ends of the tubes sequentially to position of rest adjacent to said units, means for reciprocating said units transversely of the line of conveyor advance to move said units, in the intervals of conveyor rest, into encircling positions upon the ends of successive tubes, means for adjusting said conveyor to shift its tube-conveying reach relatively to the line of said units, and means for adjusting said tube-rotating means relatively to said conveyor.

15. Apparatus for spinning the ends of glass tubes comprising a heating unit and a spinning unit supported in a line, an endless conveyor having a tube-supporting reach extending parallel to the line of said units, said conveyor being provided with a series of spaced-apart pairs of disks forming between the peripheries of the disks of each pair a tube-receiving notch and two pairs of such disks aligned transversely of the conveyor providing a tube support, means for rotating the so supported tubes on the conveyor, means for advancing said conveyor intermittently in a direction transverse to the length of the tubes to bring the ends of the tubes sequentially to position of rest adjacent to said units, means for reciprocating said units transversely of the line of conveyor advance to move said units, in the intervals of conveyor rest, into encircling positions upon the ends of succcessive tubes, and means organized with said spinning unit for securing a tube against the rotative effect of said tube-rotating means when such spinning unit is in encircling position on the end of the tube.

HAROLD H. SNYDER.